United States Patent [19]

Powers, Jr. et al.

[11] 4,277,351

[45] Jul. 7, 1981

[54] METHOD FOR IMPROVING SULFONATE SURFACTANTS USED IN ENHANCED RECOVERY PROCESSING IN SUBTERRANEAN OIL-BEARING FORMATIONS

[75] Inventors: George W. Powers, Jr., Crown Point, Ind.; H. Robert Froning; Davis L. Taggart, both of Tulsa, Okla.

[73] Assignee: Standard Oil Company (Indiana), Chicago, Ill.

[21] Appl. No.: 105,492

[22] Filed: Dec. 20, 1979

Related U.S. Application Data

[63] Continuation of Ser. No. 858,658, Dec. 8, 1977, abandoned.

[51] Int. Cl.$^3$ ............................................. C09K 3/00
[52] U.S. Cl. ............................... 252/8.55 D; 166/270; 166/274; 260/513 T
[58] Field of Search ...................... 252/8.55 D, 353; 166/270, 273, 274, 275; 260/503, 513 T

[56] References Cited

U.S. PATENT DOCUMENTS

| | | | |
|---|---|---|---|
| 3,714,062 | 1/1973 | Askew et al. | 252/308 X |
| 3,997,451 | 12/1976 | Plummer et al. | 252/8.55 D X |
| 4,125,158 | 11/1978 | Warte et al. | 252/8.55 D X |

Primary Examiner—Benjamin R. Padgett
Assistant Examiner—J. L. Barr
Attorney, Agent, or Firm—Mark DiPietro; William T. McClain; William H. Magidson

[57] ABSTRACT

A method is disclosed for reducing formation plugging impurities in a sulfonate surfactant used in enhanced oil recovery operations which comprises contacting said surfactant with an effective amount of an aldehyde having from 1 to about 18 carbon atoms. In a preferred instance, a method is disclosed for the treatment of sulfonate surfactants useful in enhanced recovery processing to substantially reduce the formation plugging impurities, typically inorganic sulfite salts.

7 Claims, No Drawings

METHOD FOR IMPROVING SULFONATE SURFACTANTS USED IN ENHANCED RECOVERY PROCESSING IN SUBTERRANEAN OIL-BEARING FORMATIONS

This is a continuation of application Ser. No. 858,658, filed Dec. 8, 1977 abandoned.

This invention relates to chemicals suitable for use in enhanced recovery of crude oils from subterranean formations. More specifically this invention relates to a method of improving the performance of sulfonate surfactants by contacting them with an aldehyde to reduce formation plugging impurities which in many instances are contained in these materials. In a specific instance, the field of the invention resides in an improved process for recovering oil from a subterranean formation incorporating the improvement claimed herein.

There is much art relating to the use of sulfonates as surfactants in enhanced recovery operations where crude oil is recovered from subterranean formations. Many of the prior art patents relate to micellar flooding techniques in which aliphatic polymer or petroleum sulfonate surfactants are mixed with a brine stream and injected into a subterranean formation to cause the crude oil remaining in the formation to be solubilized and ultimately recovered.

U.S. Pat. No. 3,354,953 to R. A. Morse discloses recovery of oil from reservoirs using what is referred to as a solvent which is mutually miscible or at least partially miscible in water and crude oil. The patent discloses both miscible and micellar enhanced recovery operations.

The use of crude oil sulfonates for recovery of crude from subterranean formations is disclosed in Canadian Pat. No. 971,186, issued July 15, 1975. This patent specifically relates to the sulfonation of crude oils and processes using those materials in micellar dispersions for the recovery of hydrocarbons.

Asket et al. U.S. Pat. No. 3,714,062 discloses the use of alkaline metal straight chain hydrocarbon polymer sulfonates in tertiary oil recovery operations, in particular in micellar flooding.

U.S. Pat. No. 3,800,877 issued Apr. 2, 1974 discloses the use of aldehydes as oxygen scavengers in polymer solutions, such as polyacrylamide systems suitable for mobility control in the formation. Typically, the mobility control slug is injected into a formation after the formation has received a surfactant in the form of a micellar slug. The mobility control slug is of sufficient viscosity to allow the surfactant to be pushed through the subterranean formation and substantially reduce fingering or bypassing of portions of the formation. Although Oxygen present in the aqueous solutions of polymers degrades certain polymers and these degraded polymers adversely affect the mobility control of the slug, oxygen does not degrade petroluem sulfonate surfactants. Accordingly, oxygen scavengers are not employed with petroleum sulfonate surfactants.

Generally, in the production of petroleum sulfonates or aliphatic hydrocarbon sulfonates or other polymer sulfonates, $SO_3$ or fuming sulfuric acid contacts the organic material for reaction to sulfonic acid followed by extraction and subsequent neutralization to the sulfonate. In instances of commercial production of sulfonate in which gases containing $SO_2$ are present in the $SO_3$, most of the gaseous $SO_2$ material generally can be disposed of by neutralizing with caustic or ammonia during the preparation of the respective sulfonic acid material. However, high concentrations of inorganic sulfites remain in the surfactant when neutralized in production which subsequently have a deleterious effect on the use of sulfonates in oil recovery.

Many commercial sulfonate surfactants contain relatively high quantities of inorganic sulfites, as much as from 2 to 10 weight percent. Accordingly, when the sulfonates are used for enhanced recovery of crude oil with brine containing a high concentration of divalent cations, specifically calcium, the divalent cations cause precipitation to occur. Such precipitates are generally calcium sulfite which cause substantial formation plugging. The tendency to form a precipitate and resultant plugging of the formation increases as the total divalent solids dissolved in the brine increase. Additionally, plugging of lines and cores also occurs as a result of the formation of the insoluble sulfites.

The general object of the present invention is to provide sulfonate surfactant composition having reduced formation plugging properties which can be injected into an oil-bearing formation.

It is another object of the present invention to provide a micellar slug comprising a sulfonate and an aqueous brine solution which have substantially reduced formation plugging properties.

We have found that the objects of this invention can be attained by treating sulfonates with aldehydes. The sulfite in the surfactant is complexed thereby reducing any precipitation of the sulfonate when it is added to brine. Long chain aldehydes, such as palmitaldehyde, have the additional advantage that aldehyde complexes of the sulfite originally present in the surfactant produce additional surfactancy and are beneficial in mobility control and tertiary oil recovery.

Briefly, this invention comprises contacting a sulfonate surfactant preferably an aqueous dispersion containing sulphite impurities with sufficient aldehyde having from 1 to 18 carbon atoms to complex said sulphite impurities. The resultant stabilized composition, preferably an aqueous sulfonate dispersion, can be injected into a formation and contacted with a brine stream without precipitation of sulphite.

The sulfonate surfactants useful in this invention have an average molecular weight greater than about 250, and are described in U.S. Pat. Nos. 3,714,062; 3,997,451; and Canadian Pat. No. 971,186 which are expressly incorporated by reference herein for discussion of sulfonate materials which will act as surfactants. Suitable sulfonate surfactant include petroleum sulfonates which generally include whole or top crude oils, gas oils or other fractions of a crude oil stream; aliphatic hydrocarbon polymer sulfonates; such as alkaline metal straight chain hydrocarbon polybutene or polypropylene polymer sulfonate; synthetically prepared aromatic polymer sulfonates, other petrochemical derivatives containing a sulfonate grouping thereon and possessing surfactancy characteristics. An especially preferred polymer sulfonate, due to its low cost and high activity, is a sulfonate having an average equivalent molecular weight in the range of from about 250 to about 675 (equivalent molecular weight refers to the molecular weight of the product per each mole of sulfonate). If desired mixtures of petroleum aliphatic or aromatic hydrocarbon sulfonates can be used.

As indicated above, the impurities which cause formation plugging are generally formed by contacting $SO_3$ with a hydrocarbon product producing $SO_2$ gas byproduct. When the hydrocarbon sulfonate is neutralized with sodium hydroxide the sulfite impurities are held in solution. The impurities are inorganic sulfites, typically sodium sulfite. The sodium sulfite levels of laboratory prepared sulfonates are usually less than about 0.1 weight percent. Thus there is no need or problem associated with $SO_2$ disposal. In commercial production, however, the quantities of the inorganic sulfite present in the sulfonate product vary anywhere from less than 2 to as much as 10 or more weight percent of the total sulfonate material.

The aldehydes useful in this invention contain from 1 to about 18 carbon atoms per molecule and produce typically water soluble sulfite complexes. Preferably the aldehyde is formaldehyde, usually as formalin, trioxane, paraformaldehyde or an equilibrium mixture thereof. Other aldehydes can be used such as acetaldehyde, propaldehyde, butraldehyde, palmitaldehyde, stearaldehyde, olealdehyde, linolealdehyde, etc. It is theorized that the aldehyde reacts with the sulfite ($SO_3^{--}$) in an aqueous solution to form a hydroxysulfonate, $RCH(OH)SO_3^{--}$, which stabilize the sulfonate composition in the reservoir over certain ranges of pH's. An alternative reaction path in the production of the hydroxysulfonate from the sulfite ($SO_3^{--}$) is the formation of bisulfite ($HSO_3^{--}$) by reaction of the sulfite with hydrogen ion followed by reaction of the bisulfite with aldehyde to form the hydroxysulfonate.

In somewhat greater detail the present claimed process can be practiced in one instance by contacting the aldehyde with a sulfonate surfactant concentrate, that is, a material containing the highly concentrated mixture of the sulfonate. In other instances, the present process can take place by contacting the aldehyde with a mixture of the diluted sulfonate surfactant and water which material is injected through an injection well into the subterranean formation. When the connate water (i.e. water which is produced from wells along with crude oil) containing high concentrations of calcium is mixed with the sulfonate surfactant for use in micellar flooding, it is preferred to contact the surfactant with the aldehyde prior to contact with the brine or mix the aldehyde with the sulfonate surfactant immediately after its manufacture and prior to dilution for field use in micellar flooding. An additional scheme is to incorporate the aldehyde into the sulfonate, i.e., the addition of the aldehyde to the sulfonic acid during the neutralization thus forming the aldehyde addition product in situ.

Commercial sulfonate surfactants are commonly produced at high pH. The resulting high pH of the surfactant can cause instability of the hydroxysulfonate complex at high temperatures. The pH is adjusted to between 6 to 10 when operation in reservoirs at about 100° F. to 180° F. or higher is contemplated. The pH can be adjusted with acid, preferably hydrochloric acid, to maintain the pH of the aqueous mixture which is injected into the formation at such a pH that the reservoir pH is anywhere from about 6 to about 10 to retain stability of the hydroxysulfonate. Above and below these ranges the hydroxy sulfonate complex tends to generate sulfite plugging impurity at high temperatures.

The process for contacting the sulfonate surfactant together with a brine stream can generally be characterized as micellar flooding or enhanced recovery. Micellar flooding utilizes micellar dispersions which generally include microemulsions, transparent emulsions, and micellar dispersions. The micellar dispersion can be oil external or water external, preferably oil external for the purposes of use for enhanced recovery of crude oil from subterranean formations. The present treatment is also applicable to other types of flooding including miscible operations.

Typically, the sulfonate surfactant is injected together with an aqueous brine material into an oil-bearing subterranean formation. The material injected into the formation will contain anywhere from about a few to about 50 or more weight percent of sulfonate surfactant and from less than 1 to about 10 weight percent of a cosurfactant. In some instances the cosurfactants are selected from the groups of water soluble alcohols, oil soluble alcohols having no more than 10 carbon atoms and 2-12 mole ethylene oxide adduct of an alcohol having from 4 to 10 carbon atoms. From about 50 to about 99 percent or more of the mixture injected into the subterranean formation will be brine. The brine can comprise fresh water if available or connate water or a combination of both. Connate water is water from wells produced with or without petroleum.

It is well known in the art the types of operating parameters needed for successful enhanced recovery flooding of subterranean formations. It is not therefore necessary in this specification to elaborate on specific details of such operations.

The quantity of the aldehyde used can vary over wide ranges. However, it should be added at concentrations of at least the stoichiometric amount necessary to complex the sulfite in the surfactant. In some instances greater than stoichiometric concentrations are desirable to drive the reaction to substantial completion.

The concentration of aldehyde in the aqueous mixture injected into the subterranean formation can vary anywhere from around 100 parts per million to 100,000 parts per million or more and is generally dependent upon the concentration of the sulfite present in the aqueous surfactant mixture.

A broad embodiment of our invention resides in a process for reducing formation plugging impurities in a surfactant having an average molecular weight greater than about 250 wherein an aqueous mixture of said surfactant is injected into an oil-bearing subterranean formation which comprises contacting said surfactant with an effective amount of an aldehyde having from 1 to about 18 carbon atoms.

Another embodiment of our invention resides in a process for reducing formation plugging impurities in a sulfonate surfactant which surfactant is selected from the group consisting of hydrocarbon polymer sulfonates or petroleum sulfonates or mixtures thereof having an average molecular weight greater than about 250 wherein an aqueous mixture of said surfactant is injected into a subterranean formation and displaced towards at least one production means, the improvement which comprises adding to said mixture an effective amount of an aldehyde having from 1 to about 18 carbon atoms and regulating the pH of the mixture at a value of less than about 9.

The following examples are present to specifically describe preferred embodiments of the present invention and are not presented so as to unduly limit the scope of the claims appended hereto.

EXAMPLE

A commercial polybutene sulfonate surfactant, of the type described in U.S. Pat. No. 3,714,062, which contained 4.28 weight percent inorganic sulfite ($Na_2SO_3$), was mixed at room temperature with 0.09 weight percent formaldehyde thereby reducing the inorganic sulfite level to less than 0.1 weight percent.

A micellar fluid was made from an artificial brine containing 94,700 ppm Na and 5,300 ppm calcium and four weight percent of the above described polybutene sulfonate surfactant treated with formaldehyde. This fluid did not form a calcium sulfite precipitate with the sulfonate and upon addition of Turtle Bay crude did not form viscous emulsions.

When this example was repeated except that the formaldehyde was omitted, the mixture formed a heavy calcium sulfite precipitate which plated onto the container wall and settled out on the bottom. With the addition of Turtle Bay crude oil a thick visious emulsion was formed with the brine, precipitate and oil.

We claim:

1. A process for preventing formation of sulfite impurities which impede the flow of sulfonated surfactants through subterranean formations which comprises contacting a sulfonate surfactant containing sulfite impurities with an aldehyde having from about one to about eighteen carbon atoms to complex said sulfite impurities wherein said aldehyde is present at a concentration of at least the stoichiometric amount necessary to complex the sulfite in the surfactant.

2. The process of claim 1 wherein said sulfonate is in the form of an aqueous dispersion and comprises from about 1 to about 15 percent by weight sulfonate.

3. The process of claim 1 wherein said aldehyde comprises formaldehyde.

4. The process of claim 1 wherein said aldehyde is present from about 0.01 to about 1 percent by weight of said surfactant.

5. A process for reducing formation plugging impurities comprising sulfite present in a sulfonate surfactant, wherein the surfactant is injected into a subterranean formation the improvement comprising contacting the surfactant with an aldehyde having from one to eighteen carbon atoms prior to injection wherein said aldehyde is present in a concentration of at least the stoichiometric amount necessary to complex the sulfite in the surfactant.

6. The process of claim 5 wherein the sulfonate surfactant comprises an aqueous dispersion at a pH from about 6 to about 10.

7. The process of claim 6 wherein the sulfonate surfactant is injected into a subterranean formation which has a temperature of about 100° F. to 180° F.

* * * * *